United States Patent
Iwamura et al.

(10) Patent No.: US 12,212,744 B2
(45) Date of Patent: Jan. 28, 2025

(54) DEBLOCKING FILTER DEVICE, DECODING DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Yuichi Kondo, Tokyo (JP); Kazuhisa Iguchi, Tokyo (JP); Atsuro Ichigaya, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 295 days.

(21) Appl. No.: 17/655,948

(22) Filed: Mar. 22, 2022

(65) Prior Publication Data

US 2022/0217339 A1    Jul. 7, 2022

Related U.S. Application Data

(63) Continuation of application No. PCT/JP2021/021814, filed on Jun. 8, 2021.

(30) Foreign Application Priority Data

Jun. 10, 2020 (JP) .................. 2020-101293

(51) Int. Cl.
| | |
|---|---|
| *H04N 19/117* | (2014.01) |
| *H04N 19/176* | (2014.01) |
| *H04N 19/186* | (2014.01) |
| *H04N 19/46* | (2014.01) |
| *H04N 19/82* | (2014.01) |

(52) U.S. Cl.
CPC ......... *H04N 19/117* (2014.11); *H04N 19/176* (2014.11); *H04N 19/186* (2014.11); *H04N 19/46* (2014.11); *H04N 19/82* (2014.11)

(58) Field of Classification Search
CPC .. H04N 19/117; H04N 19/139; H04N 19/159; H04N 19/176; H04N 19/18; H04N 19/186; H04N 19/46; H04N 19/82; H04N 19/86
See application file for complete search history.

(56) References Cited

U.S. PATENT DOCUMENTS

| | | | | |
|---|---|---|---|---|
| 2021/0266552 | A1* | 8/2021 | Kotra | ................. H04N 19/117 |
| 2022/0329814 | A1* | 10/2022 | Zhao | ................. H04N 19/126 |
| 2022/0368898 | A1* | 11/2022 | Zhu | ................... H04N 11/046 |

OTHER PUBLICATIONS

Document: JVET-N1001-v8, Versatile Video Coding (Draft 5), Joint Video Experts Team (JVET) of ITU-T SG 16 WP 3 and ISO/IEC JTC 1/SC 29/WG 11, 14th Meeting: Geneva, CH, Mar. 19-27, 2019.*

(Continued)

*Primary Examiner* — Dakshesh D Parikh
(74) *Attorney, Agent, or Firm* — Studebaker & Brackett PC

(57) ABSTRACT

A deblocking filter device according to a first feature includes: a deblocking filter configured to perform a filter process on a boundary between a first reconstructed block and a second reconstructed block adjacent to the first reconstructed block; and a filter controller configured to control boundary filtering strength of the deblocking filter based on whether or not at least one of the first reconstructed block and the second reconstructed block is encoded using JCCR (Joint coding of chroma residual) in which one joint prediction residual is generated from prediction residuals of a Cb chrominance component and a Cr chrominance component.

7 Claims, 6 Drawing Sheets

(56) References Cited

OTHER PUBLICATIONS

International Search Report issued in PCT/JP2021/021814; mailed Aug. 17, 2021.

Benjamin Bross et al. "Versatile Video Coding (Draft 8)" Joint Video Experts Team (JVET) of ITU-T SG 16 WP 3 and ISO/IEC JTC 1/SC 29/WG 11, 17th Meeting; JVET-Q2001-v8; Jan. 7-17, 2020; pp. 1-497; Brussels, Belgium.

Christian Helmrich et al. "CE7-Related: Alternative Configuration of CE7-2.2 Joint Chroma Residual Coding" Joint Video Experts Team (JVET) of ITU-T SG 16 WP 3 and ISO/IEC JTC 1/SC 29/WG 11, 15th Meeting; JVET-O0935-v1; Jul. 3-12, 2019; pp. 1-14; Gothenburg, Sweden.

* cited by examiner

DEBLOCKING FILTER DEVICE, DECODING DEVICE AND PROGRAM

RELATED APPLICATIONS

The present application is a continuation based on PCT Application No. PCT/JP2021/021814, filed on Jun. 8, 2021, which claims the benefit of Japanese Patent Application No. 2020-101293 filed on Jun. 10, 2020. The content of which is incorporated by reference herein in their entirety.

TECHNICAL FIELD

The present invention relates to a deblocking filter device, decoding device and a program.

BACKGROUND ART

In HEVC (High Efficiency Video Coding), and VVC (Versatile Video Coding), which is a next-generation encoding scheme, a deblocking filter is adopted as an in-loop filter, to restrain distortion at a block boundary portion when an encoding process is performed on a block basis. In control of the deblocking filter, boundary filtering strength of the deblocking filter is controlled in accordance with whether or not a non-zero transform coefficient exists in at least one of two adjacent blocks. This is because, since energy of a prediction residual is distributed all over the block as a result of inverse transform of the non-zero transform coefficient, discontinuity is likely to occur at the boundary between the two blocks.

CITATION LIST

Patent Literature

Non Patent Literature 1: JVET-Q2001 "Versatile Video Coding (Draft 8)"

DISCLOSURE OF INVENTION

A deblocking filter device according to a first feature includes: a deblocking filter configured to perform a filter process on a boundary between a first reconstructed block and a second reconstructed block adjacent to the first reconstructed block; and a filter controller configured to control boundary filtering strength of the deblocking filter based on whether or not at least one of the first reconstructed block and the second reconstructed block is encoded using JCCR (Joint coding of chroma residual) in which one joint prediction residual is generated from prediction residuals of a Cb chrominance component and a Cr chrominance component.

A decoding device according to a second feature includes: the deblocking filter device according to the first feature; and an entropy decoder configured to acquire a flag indicating whether or not a block is encoded using the JCCR for each of the first reconstructed block and the second reconstructed block, wherein the filter controller controls the boundary filtering strength of the deblocking filter based on the flag for each of the first reconstructed block and the second reconstructed block.

A program according to a third feature causes a computer to function as the deblocking filter device according to the first feature.

DESCRIPTION OF EMBODIMENTS

In a draft of VVC standards, a technique called adaptive color transform (ACT) is employed in which when a chroma format of an input image is 4:4:4, a color space (RGB space) of a prediction residual is transformed into a YCgCo space, and an encoding process such as a transform process and an entropy encoding process is performed on the prediction residual after color space transform (see Non Patent Literature 1). An encoding device can control whether or not to apply ACT for each encoding-target block and outputs a stream of an ACT application flag for each encoding-target block. A decoding device restores the prediction residual by performing an entropy decoding/inverse transform process, and the like, on the block encoded using ACT and inversely transforms the color space (YCgCo space) of the restored prediction residual into the RGB space.

In the above-described technique in related art, when a non-zero transform coefficient exists in at least one of two adjacent blocks, the decoding device applies a deblocking filter to a boundary of the two blocks. On the other hand, it is also possible to employ a configuration where, when a non-zero transform coefficient exists in neither of the two adjacent blocks, the decoding device does not apply the deblocking filter to the boundary of the two blocks.

However, for a block to which ACT is applied, after the prediction residual is restored from the transform coefficients through the inverse transform process, the color space of the prediction residual is inversely transformed from the YCgCo space into the RGB space through color space inverse transform. Thus, when a non-zero transform coefficient exists in a block of a certain color component, the non-zero transform coefficient affects blocks of other color components upon the color space inverse transform.

Thus, if deblocking filter control based on whether or not a non-zero transform coefficient exists is applied to a block encoded using ACT, boundary filtering strength of the deblocking filter cannot be appropriately controlled, which may cause deterioration of image quality.

A problem similar to the above can occur also when joint coding of chroma residual (JCCR) which is another encoding tool is applied.

The present disclosure is therefore directed to providing a deblocking filter device that prevents deterioration of image quality, a decoding device and a program.

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

First Embodiment

<Configuration of Encoding Device>

Figure 1:
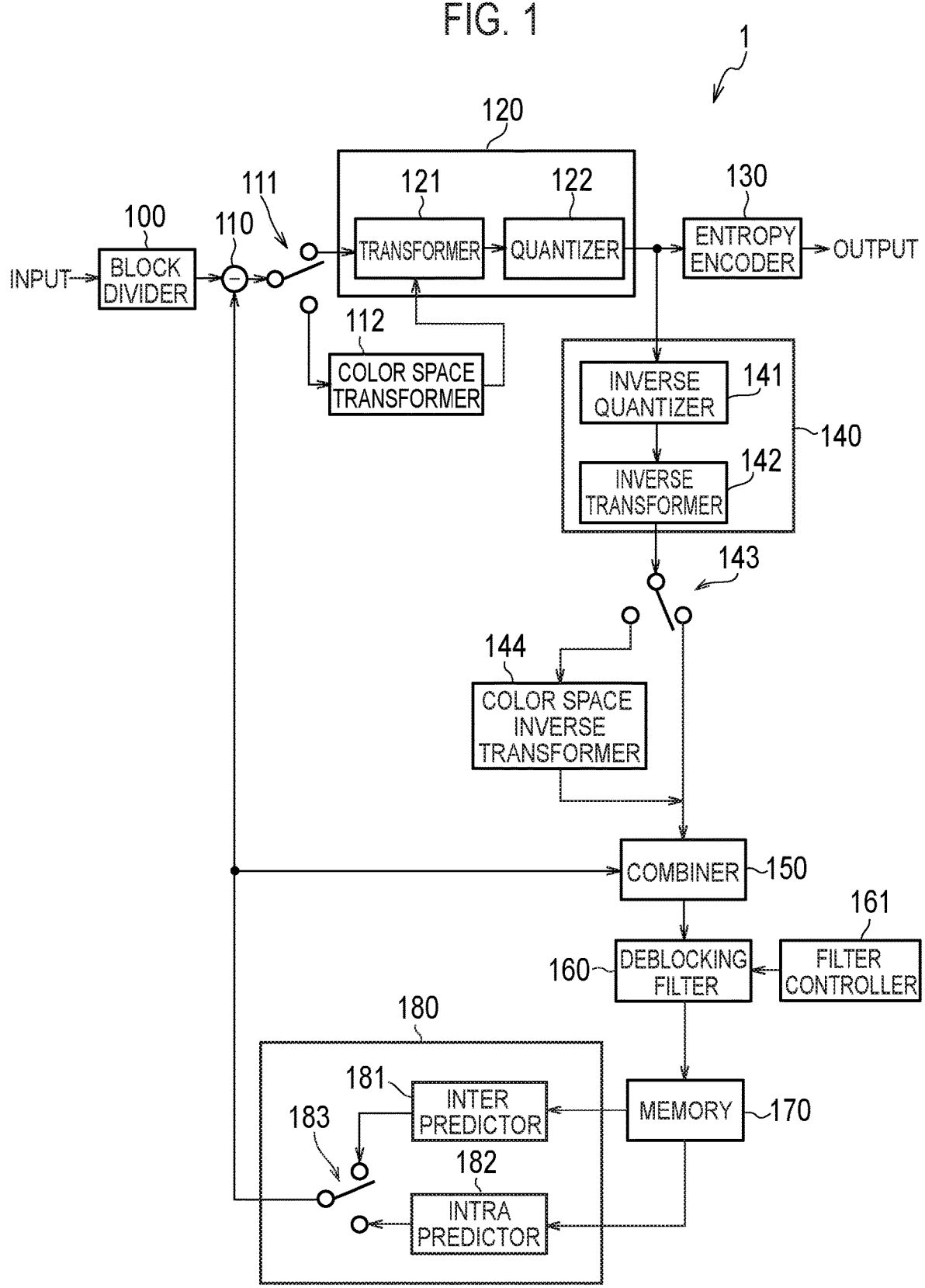
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment.

As illustrated in FIG. 1, the encoding device 1 includes a block divider 100, a residual generator 110, a switcher 111, a color space transformer 112, a transformer/quantizer 120, an entropy encoder 130, an inverse quantizer/inverse transformer 140, a switcher 143, a color space inverse transformer 144, a combiner 150, a deblocking filter 160, a memory 170, and a predictor 180.

The block divider 100 divides an original image which is an input image in frame (or picture) units that constitutes a video into a plurality of image blocks and outputs the image blocks obtained by division to the residual generator 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The input image is an RGB signal and may have a chroma format of 4:4:4. The RGB space is an example of a first color space. An "R" component corresponds to a first component, a "G" component corresponds to a second component, and a "B" component corresponds to a third component. The block divider 100 outputs a block by performing block division on each of the R component, the G component and the B component that constitute the image. In the following description of the encoding device, the block will be simply referred to as an encoding-target block when the respective color components are not distinguished from each other.

The residual generator 110 calculates prediction residuals that represent differences (errors) between an encoding-target block outputted by the block divider 100 and a prediction block obtained by the predictor 180 predicting the encoding-target block. More specifically, the residual generator 110 calculates the prediction residuals by subtracting each pixel value of the prediction block from each pixel value of the encoding-target block, and outputs the calculated prediction residuals to the switcher 111. In the present embodiment, the residual generator 110 generates a prediction residual of each color component from a difference between the encoding-target block of each color component and a prediction block of each color component.

The switcher 111 outputs a prediction residual of each color component outputted from the residual generator 110 to one of the transformer/quantizer 120 and the color space transformer 112. The switcher 111 outputs the prediction residual to the transformer/quantizer 120 when a color space transform process (ACT process) is not performed and outputs the prediction residual to the color space transformer 112 when the ACT process is performed.

The color space transformer 112 performs the ACT process on the prediction residual of each color component and outputs the prediction residual after the ACT process to the transformer/quantizer 120. The color space transformer 112 generates a new prediction residual by performing transform calculation as follows for the R component, the G component and the B component of the prediction residual of the encoding-target block.

$$Co = R - B$$
$$t = B + (Co \gg 1)$$
$$Cg = G - t$$
$$Y = t + (Cg \gg 1)$$

However, ">>" represents right shift operation. Further, the "Y" component corresponds to the first component, the "Cg" component corresponds to the second component, and the "Co" component corresponds to the third component. Such a YCgCo space is an example of a second color space.

The switcher 111 and the color space transformer 112 can control whether or not to perform a color transform process for each encoding-target block basis. The entropy encoder 130 signals a flag (ACT application flag) indicating whether or not the color transform process is performed on the encoded block in a bit stream.

Note that in the ACT process at the color space transformer 112, it is only necessary to generate a prediction residual constituted with new color components by performing addition, subtraction, multiplication, division, a shift process, and the like, on each color component. Further, the ACT process does not have to be transform that affects all color components. For example, the color space transformer 112 may apply an ACT process of maintaining the first component without changing the first component, setting an average value of the second component and the third component as a new second component, and setting a difference between the second component and the third component as a new third component.

The transformer/quantizer 120 executes a transform process and a quantization process on each of blocks. The transformer/quantizer 120 includes a transformer 121 and a quantizer 122.

The transformer 121 calculates transform coefficients by performing a transform process on the prediction residual (which will be referred to as a prediction residual regardless of whether or not the ACT process is applied) outputted from the switcher 111 or the color space transformer 112 and outputs the calculated transform coefficients to the quantizer 122. More specifically, the transformer 121 generates transform coefficients of each color component by performing a transform process on the prediction residual of each color component on a block basis. The transform process only requires to be a frequency transform such as DCT, DST, and discrete wavelet transform. Further, the transformer 121 outputs information regarding the transform process to the entropy encoder 130.

The transform process includes transform skip in which no transform process is performed, employed in the HEVC or a draft of the VVC standards. While in a transform skip mode in the HEVC, transform coefficients is obtained by performing scaling on the prediction residual without performing horizontal and vertical transform processes, in transform skip according to the present embodiment, the transform process includes transform in which only a horizontal transform process is applied and transform in which only a vertical transform process is applied. Further, the transformer 121 may perform a secondary transform process in which a transform process is further applied to the transform coefficients obtained through the transform process. Further, the secondary transform process may be applied to only part of the area of the transform coefficients.

The quantizer 122 quantizes the transform coefficients outputted from the transformer 121 using a quantization parameter and a scaling list and outputs the quantized transform coefficients to the entropy encoder 130 and the inverse quantizer/inverse transformer 140. Further, the quantizer 122 outputs information regarding the quantization process (more specifically, information on the quantization parameter and the scaling list used in the quantization process) to the entropy encoder 130 and the inverse quantizer 141.

The entropy encoder 130 performs entropy encoding on the quantized transform coefficients outputted by the quantizer 122, generates a bit stream (encoded data) by performing data compression, and outputs the bit stream to the decoding side. For the entropy encoding, Huffman coding and/or CABAC (Context-based Adaptive Binary Arithmetic Coding) or the like can be used. Moreover, the entropy encoder 130 adds information regarding the transform process inputted from the transformer 121 into the bit stream and signals to the decoding side, and adds information regarding a prediction process inputted from the predictor 180 into the bit stream and signals to the decoding side.

Further, the entropy encoder 130 adds a color space transform flag indicating whether or not ACT is applied, for each encoding-target block, into the bit stream and signals to the decoding side. Such a color space transform flag is also referred to as an ACT application flag. When the ACT application flag is ON ("1"), it is indicated that ACT is applied to a corresponding encoding-target block. When the ACT application flag is OFF ("0"), it is indicated that the ACT is not applied to the corresponding encoding-target block. Note that an ACT non-application flag may be used instead of the ACT application flag. In that case, when the ACT non-application flag is ON ("1"), it is indicated that the ACT is not applied to the corresponding encoding-target block. When the ACT non-application flag is OFF ("0"), it is indicated that the ACT is applied to the corresponding encoding-target block.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the quantized transform coefficients outputted by the quantizer 122 by using the quantization parameter (Qp) and the scaling list to restore the transform coefficients, and outputs the restored transform coefficients to the inverse transformer 142.

The inverse transformer 142 performs an inverse transform process corresponding to the transform process performed by the transformer 121. For example, when the transformer 121 performs discrete cosine transform, the inverse transformer 142 performs inverse discrete cosine transform. The inverse transformer 142 restores the prediction residual by performing the inverse transform process on the transform coefficients outputted from the inverse quantizer 141 and outputs a restoration prediction residual that is the restored prediction residual to the switcher 143.

The switcher 143 outputs the restoration prediction residual of each color component outputted from the inverse transformer 142 to one of the combiner 150 and the color space inverse transformer 144. The switcher 143 outputs the restoration prediction residual to the combiner 150 for a block to which the ACT is not applied and outputs the restoration prediction residual to the color space inverse transformer 144 for a block to which the ACT is applied.

The color space inverse transformer 144 performs a color space inverse transform process (inverse ACT process) that is an inverse process of the ACT process performed by the color space transformer 112 and outputs the prediction residual after the inverse ACT process to the combiner 150. More specifically, the color space inverse transformer 144 inversely transforms the YCgCo space into the RGB space by performing inverse transform calculation as follows using the Y component, the Cg component and the Co component of the restored prediction residual.

$$t = Y - (Cg \gg 1)$$
$$G = Cg + t$$
$$B = t - (Co \gg 1)$$
$$R = Co + B$$

The combiner 150 combines the restoration prediction residual outputted from the inverse transformer 142 or the color space inverse transformer 144 and a prediction block outputted from the predictor 180 on a pixel-by-pixel basis. The combiner 150 restores (reconstructs) the encoding-target block by adding individual pixel values of the restoration prediction residual to individual pixel values of the prediction block and outputs the restored block to the deblocking filter 160. Note that the restored block may be also referred to as a reconstructed block.

The deblocking filter 160 performs a filter process on the restored block outputted from the combiner 150 and outputs the restored block after the filter process to the memory 170. The filter controller 161 controls the deblocking filter 160. The deblocking filter 160 and the filter controller 161 will be described in detail later.

The memory 170 stores the restored block after the filter process outputted from the deblocking filter 160 and accumulates the restored blocks as restored images in units of frames. The memory 170 outputs the stored restored blocks or the restored images to the predictor 180.

The predictor 180 performs a prediction process in units of the block. The predictor 180 generates a prediction block for each color component by performing a prediction process such as intra prediction and inter prediction on the encoding-target block. The predictor 180 includes an inter predictor 181, an intra predictor 182, and a switcher 183.

The inter predictor 181 performs inter prediction utilizing an inter-frame correlation. Specifically, the inter predictor 181 calculates a motion vector through a scheme such as block matching by using the restored image stored in the memory 170 as a reference image, generates an inter prediction block by predicting the encoding-target block, and outputs the generated inter prediction block to the switcher 183. Here, the inter predictor 181 selects an optimal inter prediction method from inter prediction using a plurality of reference images (typically, bi-prediction), inter prediction using one reference image (uni-directional prediction), and performs the inter prediction by using the selected inter prediction method. The inter predictor 181 outputs information regarding the inter prediction (the motion vector and the like) to the entropy encoder 130.

The intra predictor 182 performs intra prediction utilizing an intra-frame spatial correlation. Specifically, the intra predictor 182 generates an intra prediction block by referring to restored pixels present around the encoding-target block of the restored image stored in the memory 170, and outputs the generated intra prediction block to the switcher 183. The intra predictor 182 selects an intra prediction mode to be applied to the encoding-target block from among a plurality of intra prediction modes, and predicts the encoding-target block by using the selected intra prediction mode.

The switcher 183 switches the inter prediction block outputted from the inter predictor 181 and the intra prediction block outputted from the intra predictor 182 and outputs one of the prediction blocks to the residual generator 110 and the combiner 150.

The deblocking filter 160 and the filter controller 161 according to the present embodiment will be described next.

The deblocking filter 160 performs a filter process on a block boundary between two blocks including a restored block (first block) and a restored block (second block) adjacent to the restored block and outputs the respective restored blocks after the filter process to the memory 170. The filter process is a process for mitigating signal deterioration caused by the block-based processes and is a filter process of smoothing a signal gap at a block boundary between two adjacent blocks.

The filter controller 161 controls the deblocking filter 160. More specifically, the filter controller 161 controls boundary filtering strength Bs (Boundary strength) indicating whether or not to perform a filter process on the block boundary of the block pair and filtering strength of the deblocking filter 160. The boundary filtering strength Bs refers to a parameter for determining whether or not to apply a filter process and a type of the filter process. Note that control of whether or not a filter process is performed can be regarded as control of whether the boundary filtering strength Bs is set to one or more, or to zero.

Figure 2:
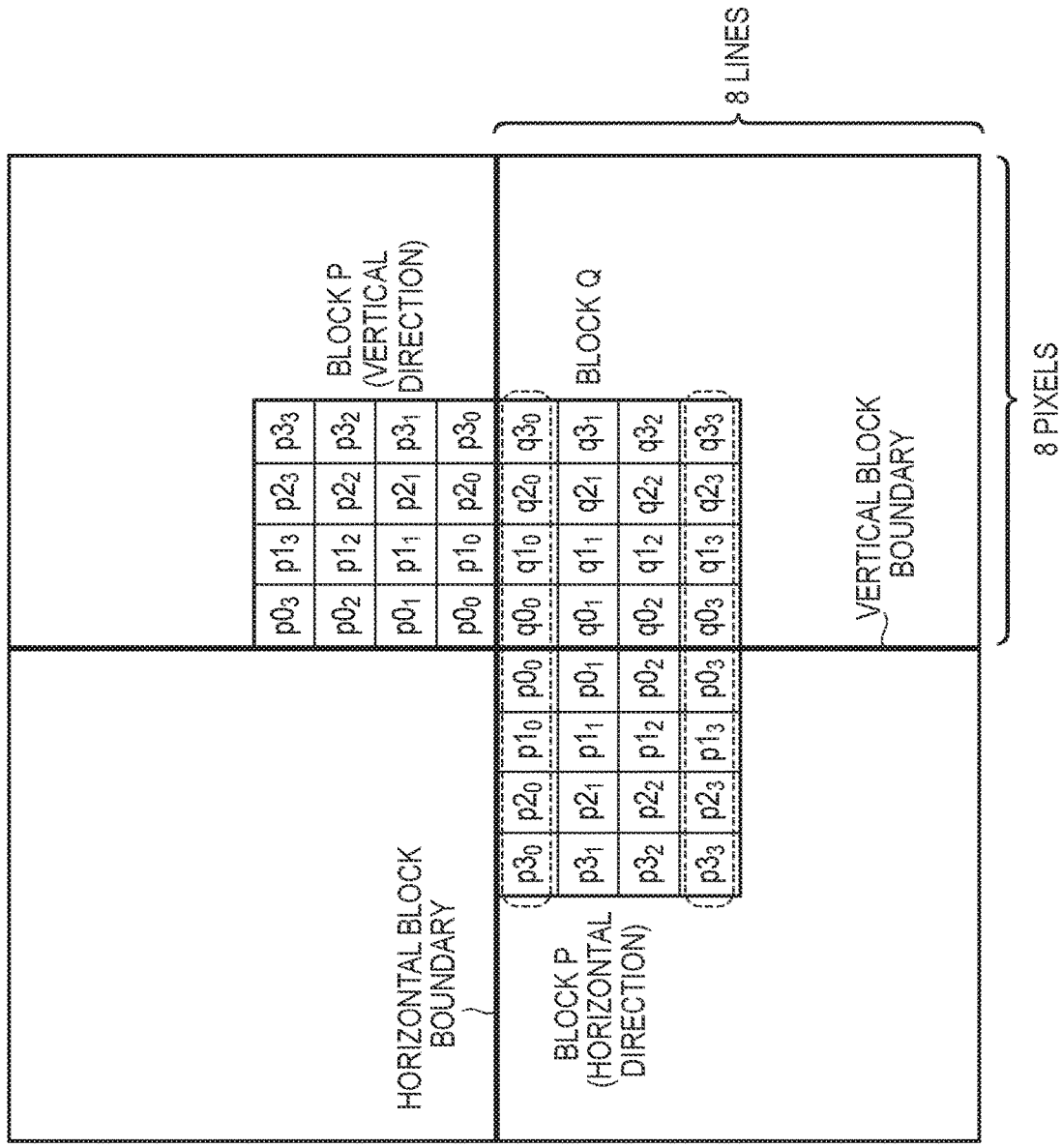
FIG. 2 is a diagram for explaining operation of a deblocking filter according to the embodiment.

FIG. 2 is a diagram for explaining operation of the deblocking filter 160 according to the present embodiment. In the example illustrated in FIG. 2, the deblocking filter 160 performs a filter process on a block boundary for each block of 8×8 pixels. Further, the deblocking filter 160 performs a filter process in units of four rows or four columns. FIG. 2 illustrates an example where each of a block P (first reconstructed block) and a block Q (second reconstructed block) is one unit of the filter process of the deblocking filter 160, and a block size is 4×4 pixels. Each of the blocks P and Q may be called a sub-block. The block Q is a restored block corresponding to the encoding-target block, and the block P is a restored block adjacent to the block Q.

The filter controller 161 determines the boundary filtering strength Bs on the basis of the following Table 1. It is assumed in the present embodiment that a value of the boundary filtering strength Bs is one of 0, 1 and 2.

| Bs value | Conditions for determining Bs value |
| --- | --- |
| 2 | Intra prediction is applied to at least one of blocks |
| 1 | Difference between motion vectors of both blocks is equal to or larger than threshold value |
| 1 | The numbers of motion vectors of both blocks, or reference images thereof are different |
| 1 | At least one of blocks includes a significant transform coefficient (a non-zero transform coefficient) |
| 1 | ACT is applied to at least one of blocks |
| 0 | Other than above |

As illustrated in FIG. 2 and Table 1, the filter controller 161 sets the Bs value to 2 when intra prediction is applied to at least one of the blocks P and Q.

The filter controller 161 sets the value of Bs to 1 when motion-compensated prediction (inter prediction) is applied to both of the blocks P and Q, and when at least one condition of the following (a) to (d) is satisfied, and otherwise sets the value of Bs to 0.
(a) The absolute value of a difference between motion vectors of the blocks P and Q is equal to or larger than a threshold value (for example, one pixel).
(b) The numbers of motion vectors of the blocks P and Q, or reference images thereof, are different.
(c) At least one of the blocks P and Q includes a significant transform coefficient (that is, a non-zero transform coefficient).
(d) ACT is applied to at least one of the blocks P and Q.

The filter controller 161 controls the deblocking filter 160 such that the deblocking filter process is not performed when the value of the boundary filtering strength Bs is 0. Hereinafter, a description is given, taking a vertical block boundary illustrated in FIG. 2 as an example.

When the value of the boundary filtering strength Bs is 1 or 2, the filter controller 161 may control the deblocking filter 160 such that the deblocking filter process is performed only when a following expression (1) is satisfied.

[Expression 1]

$$|p2_0 - 2p1_0 + p0_0| + |p2_3 - 2p1_3 + p0_3| + \\ |q2_0 - 2q1_0 + q0_0| + |q2_3 - 2q1_3 + q0_3| < \beta \quad (1)$$

Note that when the deblocking filter process is performed, the filter controller 161 may apply a stronger filter when all of following conditional expressions (2) to (7) are satisfied, and otherwise apply a weaker filter.

[Expression 2]

$$2(|p2_0 - 2p1_0 + p0_0| + |q2_0 - 2q1_0 + q0_0|) < \beta/4 \quad (2)$$

$$2(|p2_3 - 2p1_3 + p0_3| + |q2_3 - 2q1_3 + q0_3|) < \beta/4 \quad (3)$$

$$|p3_0 - p0_0| + |q0_3 - q3_0| < \beta/8 \quad (4)$$

$$|p3_3 - p0_3| + |q0_3 - q3_3| < \beta/8 \quad (5)$$

$$|p0_0 - q0_0| < (5t_C + 1)/2 \quad (6)$$

$$|p1_3 - q0_3| < (5t_C + 1)/2 \quad (7)$$

However, the threshold value $\beta$ and the value $t_C$ change according to an average value $Q_{av}$ of the quantization parameter between the adjacent blocks P and Q.

<Configuration of Decoding Device>

Figure 3:
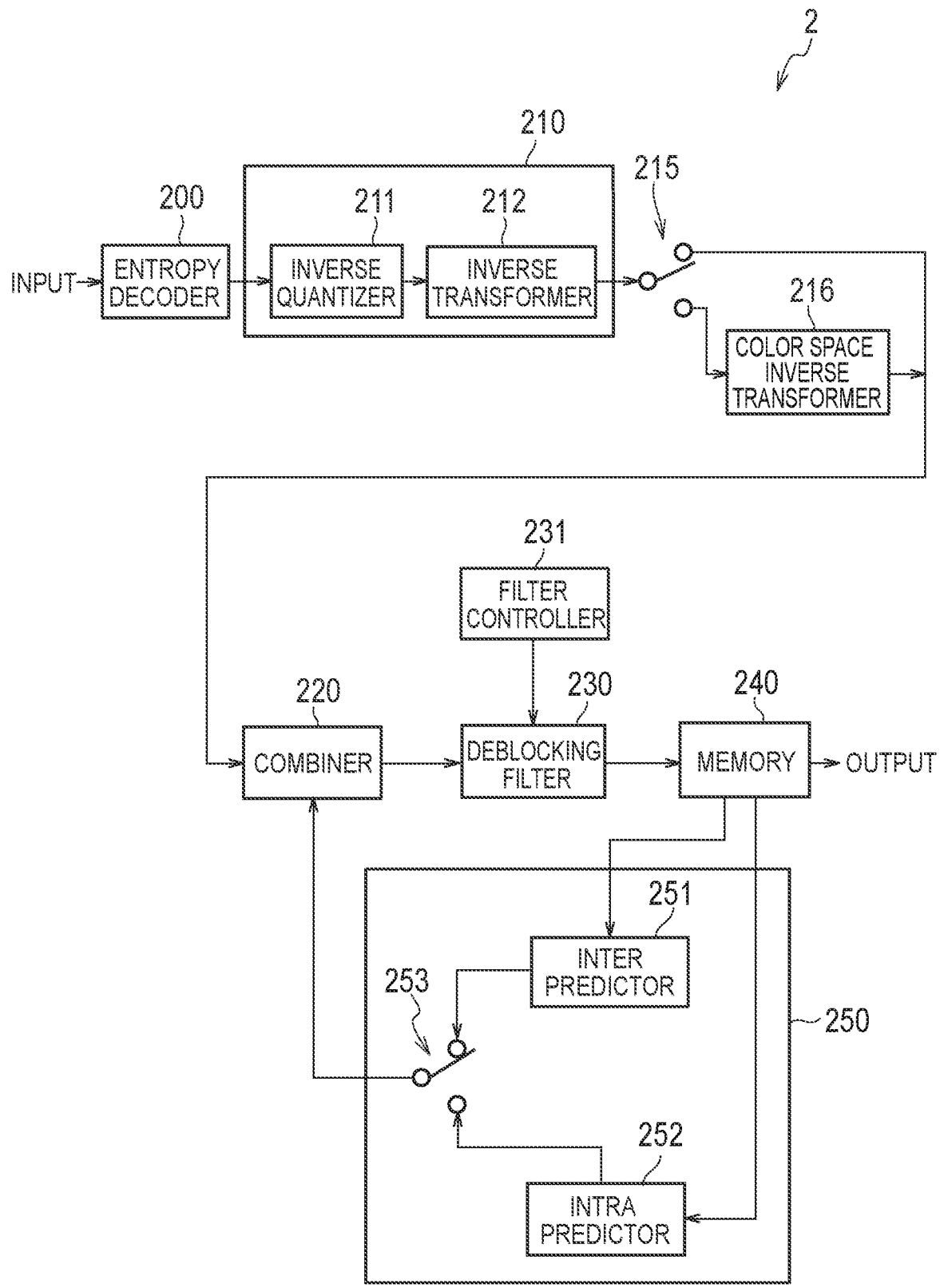
FIG. 3 is a diagram illustrating a configuration of a decoding device according to the embodiment.

Next, a decoding device according to the present embodiment is described, focusing mainly on differences from the encoding device 1. FIG. 3 is a diagram illustrating a configuration of the decoding device 2 according to the present embodiment.

As illustrated in FIG. 3, the decoding device 2 includes an entropy decoder 200, an inverse quantizer/inverse transformer 210, a switcher 215, a color space inverse transformer 216, a combiner 220, a deblocking filter 230, a memory 240, and a predictor 250.

The entropy decoder 200 decodes the encoded data (bit stream), acquires quantized transform coefficients corresponding to a decoding-target block and outputs the acquired quantized transform coefficients to the inverse quantizer/inverse transformer 210. Further, the entropy decoder 200 acquires information regarding the transform process and the quantization process and outputs the information regarding the transform process and the quantization process to the inverse quantizer/inverse transformer 210. Further, the entropy decoder 200 acquires information regarding a prediction process and outputs the information regarding the prediction process to the predictor 250. The entropy decoder 200 acquires a color space transform flag for each decoding-target block and outputs the acquired color space transform flag to the switcher 215 and a filter controller 231.

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs an inverse quantization process corresponding to the quantization process performed by the quantizer 122 of the encoding device 1. The inverse quantizer 211 restores the transform coefficients of the decoding-target block by inversely quantizing the quantized transform coefficients outputted from the entropy decoder 200 using the quantization parameter (Qp) and the scaling list and outputs the restored transform coefficients to the inverse transformer 212.

The inverse transformer 212 performs the inverse transform process corresponding to the transform process performed by the transformer 121 of the encoding device 1. The inverse transformer 212 restores prediction residuals by performing the inverse transform process on the transform coefficients outputted by the inverse quantizer 211, and outputs the restored prediction residuals to the switcher 215.

The switcher 215 outputs the prediction residual of each color component outputted from the inverse transformer 212 to one of the combiner 220 and the color space inverse transformer 216 on the basis of the color space transform flag. The switcher 215 outputs the prediction residual to the combiner 220 for a block to which a color space inverse transform process (ACT) is not applied and outputs the prediction residual to the color space inverse transformer 216 for a block to which ACT is applied.

The color space inverse transformer 216 performs a color space inverse transform process (inverse ACT process) which is an inverse process of the ACT process performed by the color space transformer 112 of the encoding device 1 and outputs the prediction residual after the inverse ACT process to the combiner 220. More specifically, the color space inverse transformer 216 performs inverse transform calculation as follows using the Y component, the Cg component and the Co component of the restored prediction residual.

$$t = Y - (Cg \gg 1)$$
$$G = Cg + t$$
$$B = t - (Co \gg 1)$$
$$R = Co + B$$

The combiner 220 decodes (reconstructs) the original block by combining the prediction residual outputted from the switcher 215 or the color space inverse transformer 216 and the prediction block outputted from the predictor 250 on a pixel-by-pixel basis and outputs the restored block to the deblocking filter 230.

The deblocking filter 230 performs a filter process on the restored block outputted from the combiner 220 and outputs the restored block after the filter process to the memory 240. More specifically, the deblocking filter 230 performs a filter process on a block boundary between two blocks including the restored block (first block) and a restored block (second block) adjacent to the restored block and outputs the respective restored blocks after the filter process to the memory 240. Functions of the deblocking filter 230 are similar to the functions of the deblocking filter 160 of the encoding device 1.

The filter controller 231 controls the deblocking filter 230. More specifically, the filter controller 231 controls boundary filtering strength Bs (Boundary strength) indicating whether or not to perform a filter process on the block boundary of the block pair and filtering strength of the deblocking filter 230. Functions of the filter controller 231 are similar to the functions of the filter controller 161 of the encoding device 1. The functions of the filter controller 231 determines the boundary filtering strength Bs on the basis of the above-described Table 1.

In other words, the filter controller 231 according to the present embodiment controls the boundary filtering strength Bs of the deblocking filter 230 on the basis of whether or not at least one of the adjacent blocks P and Q is encoded using adaptive color transform (ACT).

As described above, the entropy decoder 200 acquires a flag (color space transform flag) indicating whether or not the block is encoded using adaptive color transform for each of the blocks P and Q. The filter controller 231 controls the boundary filtering strength Bs of the deblocking filter 230 on the basis of the color space transform flag for each of the blocks P and Q.

When at least one of the blocks P and Q is encoded using the adaptive color transform, the filter controller 231 controls the boundary filtering strength Bs such that the filter process is performed by the deblocking filter 230 (that is, sets the boundary filtering strength Bs to 1). More specifically, even when a non-zero transform coefficient exists in neither of the blocks P and Q, when at least one of the blocks P and Q is encoded using the adaptive color transform, the filter controller 231 controls the boundary filtering strength Bs such that the filter process is performed by the deblocking filter 230.

The memory 240 stores the restored block outputted from the deblocking filter 230 and accumulates the restored blocks as restored images in units of frames. The memory 240 outputs the restored blocks or the restored images to the predictor 250. Further, the memory 240 outputs the restored images in units of frames to outside of the decoding device 2.

The predictor 250 performs prediction for each color component in units of blocks. The predictor 250 includes an inter predictor 251, an intra predictor 252, and a switcher 253.

The inter predictor 251 performs inter prediction that utilizes correlation between frames. Specifically, the inter predictor 251 generates an inter prediction block by predicting an encoding-target block by using a restored image stored in the memory 240 as a reference image, based on information regarding inter prediction (for example, motion vector information) outputted by the entropy decoder 200, and outputs the generated inter prediction block to the switcher 253.

The intra predictor 252 performs intra prediction that utilizes spatial correlation within a frame. Specifically, the intra predictor 252 generates an intra prediction block by referring to restored pixels around an encoding-target block in a restored image stored in the memory 240, by using an intra prediction mode corresponding to information regarding intra prediction (for example, intra prediction mode information) outputted by the entropy decoder 200, and outputs the generated intra prediction block to the switcher 253.

The switcher 253 switches the prediction block between the inter prediction block outputted from the inter predictor 251 and the intra prediction block outputted from the intra predictor 252 and outputs one of the prediction blocks to the combiner 220.

As described above, the decoding device 2 according to the present embodiment includes the entropy decoder 200 configured to output transform coefficients corresponding to a block P by decoding an encoded stream, the inverse quantizer/inverse transformer 210 configured to restore a prediction residual corresponding to the block P (first block) by performing an inverse quantization process and an inverse transform process on the transform coefficients outputted from the entropy decoder 200, the combiner 220 configured to reconstruct the block P by combining the restored prediction residual and a prediction block obtained by predicting the block P, the deblocking filter 230 configured to perform a filter process on a boundary between the restored block P and a restored block Q (second block) adjacent to the block P, and the filter controller 231 configured to control boundary filtering strength Bs of the deblocking filter 230 on the basis of whether or not at least one of the blocks P and Q is encoded using adaptive color transform (ACT).

For a block to which the ACT is applied, after the prediction residual is restored from the transform coefficients by the inverse transform process, a color space of the prediction residual is inversely transformed from a YCgCo space to an RGB space by color space inverse transform (inverse ACT). Thus, when a non-zero transform coefficient exists in a block of a certain color component, the non-zero transform coefficient affects blocks of other color components upon the color space inverse transform.

Thus, the filter controller 231 according to the present embodiment controls the boundary filtering strength Bs of the deblocking filter 230 in consideration of whether or not the ACT is applied as well as controlling the boundary filtering strength Bs of the deblocking filter 230 on the basis of whether or not a non-zero transform coefficient exists. This enables appropriate control of the boundary filtering strength Bs of the deblocking filter 230, so that it is possible to prevent deterioration of image quality even when the ACT is applied.

<Operation of Filter Controller>

Figure 4:
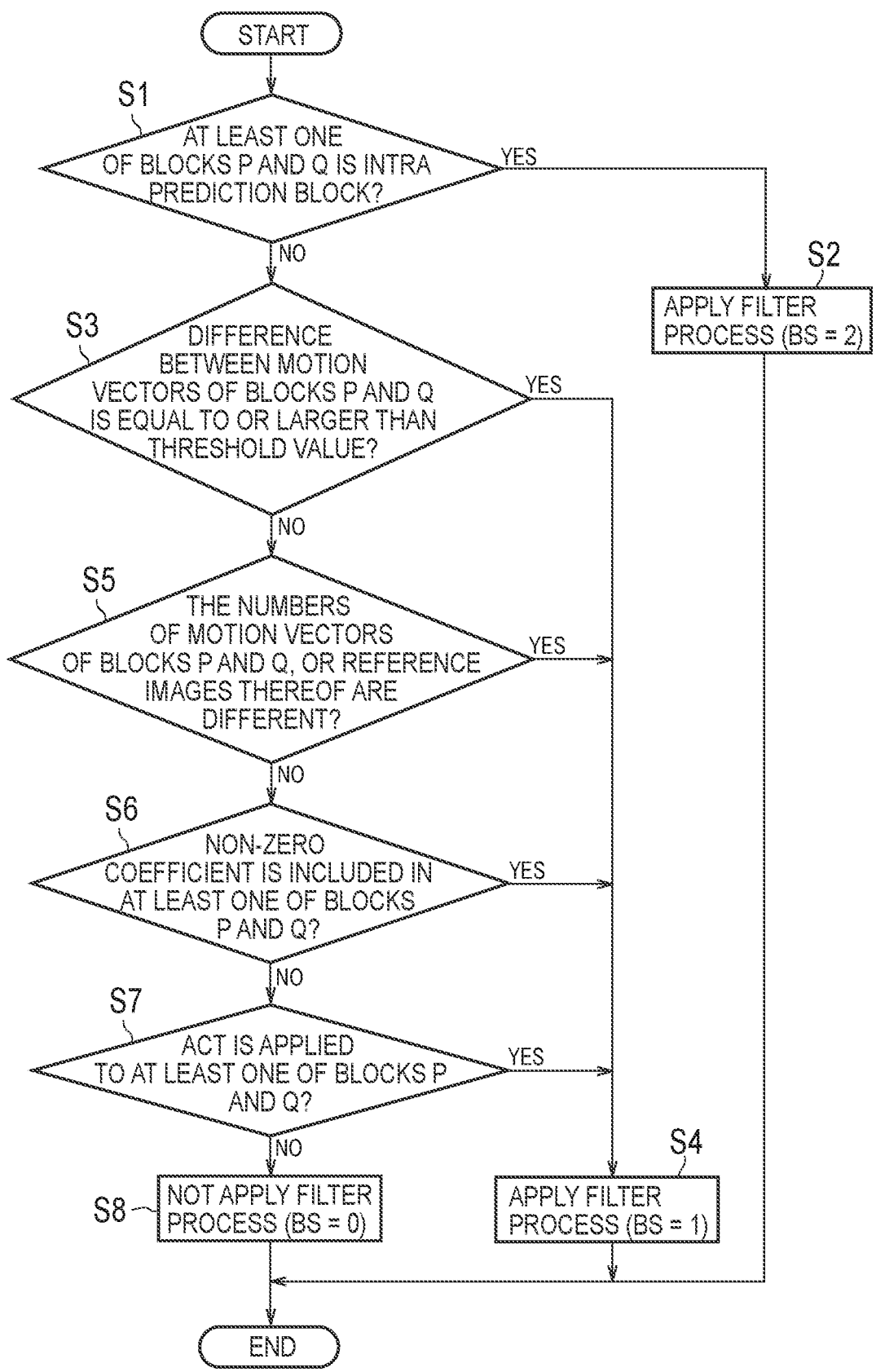
FIG. 4 is a diagram illustrating an operation example of a filter controller according to the embodiment.

Operation of the filter controller 161 and the filter controller 231 according to the present embodiment will be described next. The filter controller 161 on an encoding side and the filter controller 231 on a decoding side perform the same operation, and thus, a description is given, taking the filter controller 231 on the decoding side as an example. FIG. 4 is a diagram illustrating an operation example of the filter controller 231 according to the present embodiment. Note that order of determination illustrated in FIG. 4 is an example, and the order of determination may be changed.

As illustrated in FIG. 4, in step S1, the filter controller 231 determines whether or not intra prediction is applied to at least one of a block pair including the blocks P and Q. When intra prediction is applied to at least one of the block pair (step S1: YES), in step S2, the filter controller 231 controls the deblocking filter 230 such that the deblocking filter process is performed. More specifically, the filter controller 231 sets the boundary filtering strength Bs to 2.

When intra prediction is applied to neither of the block pair (step S1: NO), in step S3, the filter controller 231 determines whether or not a difference between motion vectors of a target block pair is equal to or larger than a threshold value. When the difference between the motion vectors of the target block pair is equal to or larger than the threshold value (step S3: YES), in step S4, the filter controller 231 controls the deblocking filter 230 such that the deblocking filter process is performed. More specifically, the filter controller 231 sets the boundary filtering strength Bs to 1.

When the difference between the motion vectors of the block pair is not equal to or larger than the threshold value (step S3: NO), in step S5, the filter controller 231 determines whether or not the numbers of the motion vectors of the block pair or reference images thereof are different. When the numbers of the motion vectors of the block pairs or the reference images thereof are different (step S5: YES), in step S4, the filter controller 231 controls the deblocking filter 230 such that the deblocking filter process is performed. More specifically, the filter controller 231 sets the boundary filtering strength Bs to 1.

When the numbers of the motion vectors of the block pair or the reference images thereof are the same (step S5: NO), in step S6, the filter controller 231 determines whether or not a non-zero transform coefficient is included in at least one of the block pair. When a non-zero transform coefficient is included in at least one of the block pair (step S6: YES), in step S4, the filter controller 231 controls the deblocking filter 230 such that the deblocking filter process is performed. More specifically, the filter controller 231 sets the boundary filtering strength Bs to 1.

When a non-zero transform coefficient is included in neither of the blocks of the block pair (step S6: No), in step S7, the filter controller 231 determines whether or not at least one of the block pair is encoded using the ACT on the basis of the color space transform flag of each block outputted from the entropy decoder 200. When at least one of the block pair is encoded using the ACT (step S7: Yes), in step S4, the filter controller 231 controls the deblocking filter 230 such that the deblocking filter process is performed. More specifically, the filter controller 231 sets the boundary filtering strength Bs to 1. On the other hand, when none of the blocks of the block pair is encoded using the ACT (step S7: NO), in step S8, the filter controller 231 controls the deblocking filter 230 such that the deblocking filter process is not performed. More specifically, the filter controller 231 sets the boundary filtering strength Bs to 0.

<Modification 1>

The filter controller 231 on the decoding side may determine whether or not at least one of the block pair (the block P and the block Q) includes a non-zero transform coefficient on the basis of a flag signaled from the encoding device 1.

More specifically, the entropy encoder 130 of the encoding device 1 includes a flag (tu_coded_flag) indicating whether or not the block includes a non-zero transform coefficient in an encoded stream for each block. For example, the entropy encoder 130 sets the flag (tu_coded_flag) to "1" for a block including a non-zero transform coefficient and sets the flag (tu_coded_flag) to "0" for a block not including a non-zero transform coefficient.

The entropy decoder 200 of the decoding device 2 acquires the flag (tu_coded_flag) for each block and outputs the acquired flag (tu_coded_flag) to the filter controller 231. The filter controller 231 interprets a block for which the flag (tu_coded_flag) is "1" as a block including a non-zero transform coefficient. Then, the filter controller 231 sets the boundary filtering strength Bs of the deblocking filter 230 as indicated in Table 2 below.

| Bs value | Conditions for determining Bs value |
| --- | --- |
| 2 | Intra prediction is applied to at least one of blocks |
| 1 | Difference between motion vectors of both blocks is equal to or larger than threshold value |
| 1 | The numbers of motion vectors of both blocks, or reference images thereof are different |
| 1 | tu_coded_flag of at least one of blocks is "1" |
| 1 | ACT is applied to at least one of blocks |
| 0 | Other than above |

As indicated in Table 2, when tu_coded_flag of at least one of the blocks of the block pair is "1", the filter controller 231 controls the deblocking filter 230 such that the deblocking filter process is performed. More specifically, the filter controller 231 sets the boundary filtering strength Bs to 1.

<Modification 2>

As described above, for a block to which the ACT is applied, after the prediction residual is restored from the transform coefficients by the inverse transform process, the color space of the prediction residual is inversely transformed from the YCgCo space to the RGB space by inverse ACT. Thus, when a non-zero transform coefficient exists in a block of a certain color component, the non-zero transform coefficient affects blocks of other color components upon the inverse ACT.

Thus, when the ACT is applied, control of the boundary filtering strength Bs of the deblocking filter 230 based on whether or not a non-zero transform coefficient exists does not appropriately function. Thus, in the present modification, the boundary filtering strength Bs of the deblocking filter 230 is controlled not on the basis of the transform coefficients but on the basis of the prediction residual after the inverse transform process. By this means, even if the non-zero transform coefficient affects blocks of other color components upon the inverse ACT, the boundary filtering strength Bs of the deblocking filter 230 can be appropriately controlled on the basis of the prediction residual after the blocks are affected.

In other words, the filter controller 161 and the filter controller 231 according to the present modification set the boundary filtering strength Bs of the deblocking filter 230 on the basis of Table 3 below.

| Bs value | Conditions for determining Bs value |
| --- | --- |
| 2 | Intra prediction is applied to at least one of blocks |
| 1 | Difference between motion vectors of both blocks is equal to or larger than threshold value |
| 1 | The numbers of motion vectors of both blocks, or reference images thereof are different |
| 1 | Prediction residual of at least one of blocks includes non-zero value |
| 0 | Other than above |

Figure 5:
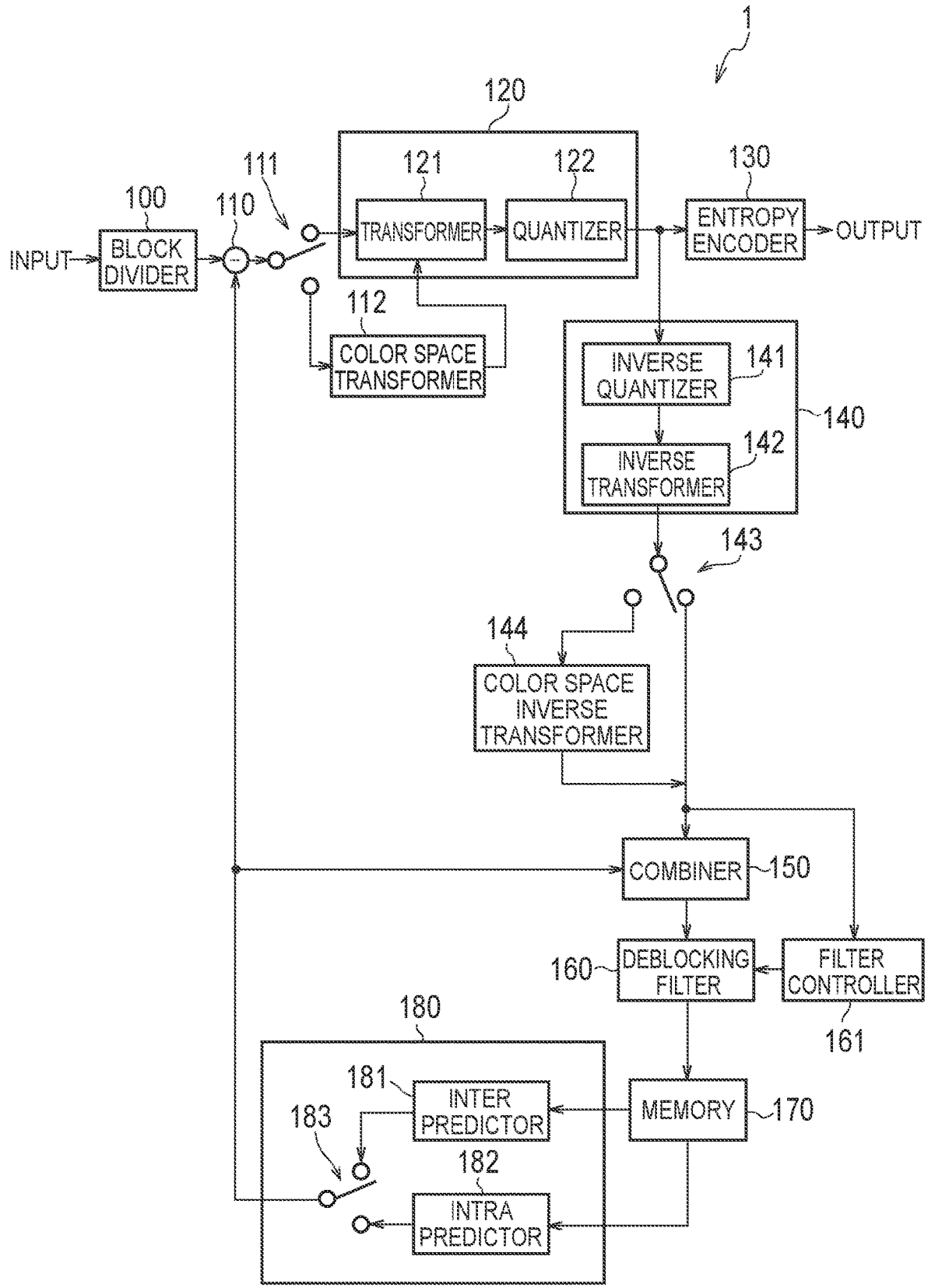
FIG. 5 is a diagram illustrating a configuration of an encoding device according to modification 2.

FIG. 5 is a diagram illustrating a configuration of the encoding device 1 according to the present modification.

As illustrated in FIG. 5, at the encoding device 1, a prediction residual that is the same as the prediction residual (restoration prediction residual) to be inputted to the combiner 150 is inputted to the filter controller 161. The prediction residual after the inverse ACT is inputted to the filter controller 161 for a block to which the ACT is applied. When the restoration prediction residual of at least one of the blocks of the block pair (the block P and the block Q) includes a non-zero value, the filter controller 161 controls the deblocking filter 160 such that the deblocking filter process is performed. More specifically, the filter controller 161 sets the boundary filtering strength Bs to 1.

Figure 6:
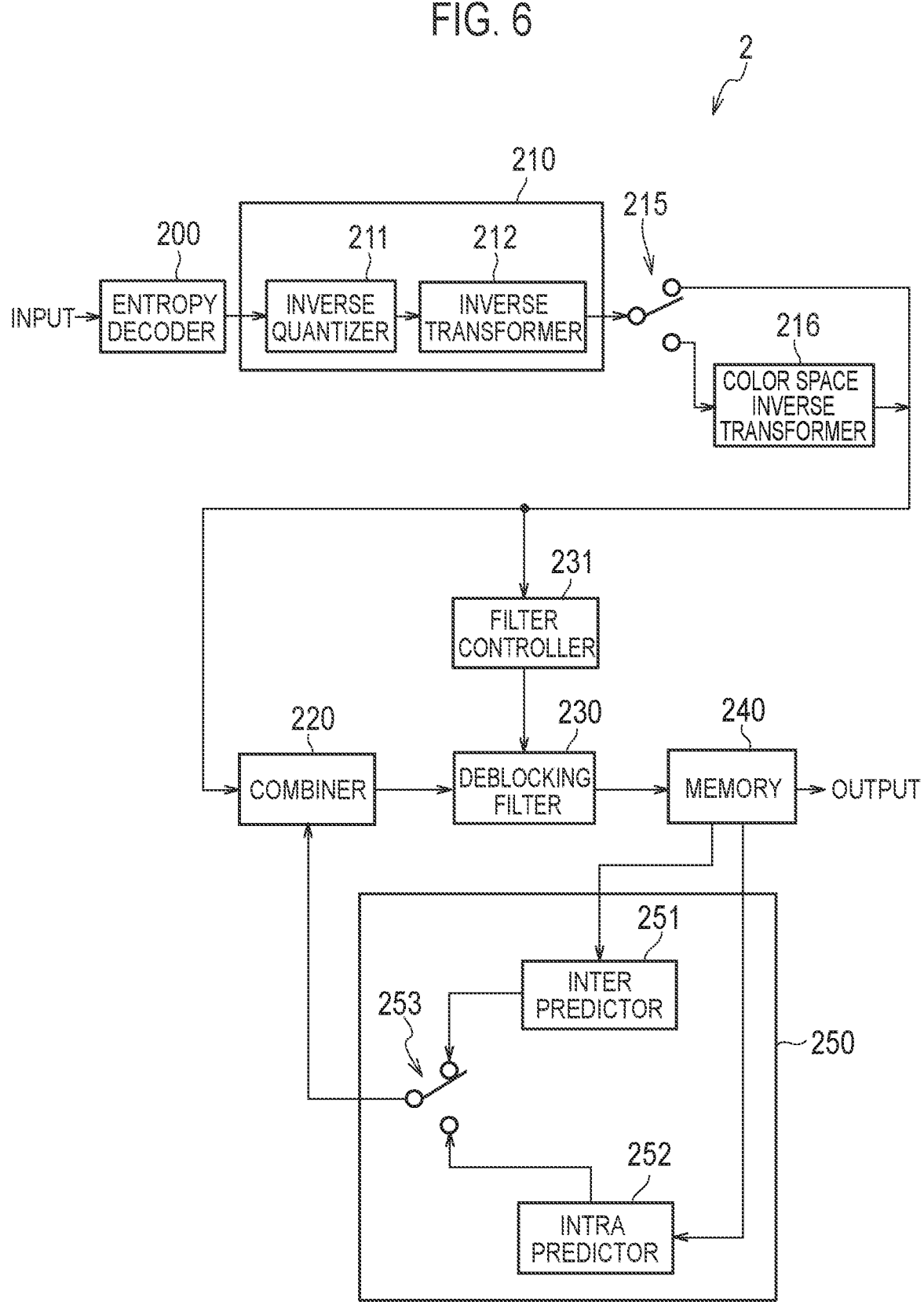
FIG. 6 is a diagram illustrating a configuration of a decoding device according to modification 2.

FIG. 6 is a diagram illustrating a configuration of the decoding device 2 according to the present modification.

As illustrated in FIG. 6, at the decoding device 2, a prediction residual that is the same as the prediction residual (restoration prediction residual) to be inputted to the combiner 220 is inputted to the filter controller 231. The prediction residual after the inverse ACT is inputted to the filter controller 231 for a block to which the ACT is applied. When the restoration prediction residual of at least one of the blocks of the block pair (the block P and the block Q) includes a non-zero value, the filter controller 231 controls the deblocking filter 230 such that the deblocking filter process is performed. More specifically, the filter controller 231 sets the boundary filtering strength Bs to 1.

Second Embodiment

In the above-described embodiment and the modifications thereof, an example has been described where the ACT which is one of encoding tools is applied. However, a problem similar to the above can occur also when joint coding of chroma residual (JCCR) which is another encoding tool is applied. Thus, the above-described embodiment and the modifications thereof may be applied to the JCCR, and the ACT in the above-described embodiment and the modifications thereof may read as the JCCR as appropriate. For example, it is possible to control the boundary filtering strength Bs as indicated in Table 4 below.

| Bs value | Conditions for determining Bs value |
| --- | --- |
| 2 | Intra prediction is applied to at least one of blocks |
| 1 | Difference between motion vectors of both blocks is equal to or larger than threshold value |
| 1 | The numbers of motion vectors of both blocks, or reference images thereof are different |
| 1 | At least one of blocks includes a significant transform coefficient (a non-zero transform coefficient) |
| 1 | JCCR is applied to at least one of blocks |
| 1 | ACT is applied to at least one of blocks |
| 0 | Other than above |

The JCCR is a coefficient encoding mode of a chrominance component (see Non Patent Literature 1). In the JCCR, the encoding device 1 generates one joint prediction residual from a prediction residual of a first chrominance component and a prediction residual of a second chrominance component by utilizing correlation between the prediction residual of the first chrominance component (Cb component) and the prediction residual of the second chrominance component (Cr component). For example, the encoding device 1 generates a joint prediction residual by combining a prediction residual obtained by inverting the polarity of the prediction residual of the second chrominance component with the prediction residual of the first chrominance component. Then, the encoding device 1 performs a transform process, a quantization process and an entropy encoding process on the generated joint prediction residual and transmits the joint prediction residual.

The decoding device 2 reconstructs the prediction residual of the first chrominance component and the prediction residual of the second chrominance component from the transmitted joint prediction residual. In this manner, by transmitting only one joint prediction residual for two chrominance components, encoding efficiency is improved.

As described above, the deblocking filter device according to the present embodiment includes a deblocking filter (160, 230) configured to perform a filter process on a boundary between a first reconstructed block (block P) and a second reconstructed block (block Q), and a filter controller (161, 231) configured to control boundary filtering strength Bs of the deblocking filter (160, 230) on the basis of whether or not at least one of the first reconstructed block (block P) and the second reconstructed block (block Q) is encoded using JCCR (Joint coding of chroma residual) in which one joint prediction residual is generated from prediction residuals of a Cb chrominance component and a Cr chrominance component.

The filter controller (161, 231) may control the boundary filtering strength Bs such that the filter process is performed by the deblocking filter (160, 230) when at least one of the first reconstructed block (block P) and the second reconstructed block (block Q) is encoded using the JCCR.

Even when a non-zero transform coefficient exists in neither of the first reconstructed block (block P) and the second reconstructed block (block Q), when at least one of the first reconstructed block (block P) and the second reconstructed block (block Q) is encoded using the JCCR, the filter controller (161, 231) may control the boundary filtering strength Bs such that the filter process is performed by the deblocking filter (160, 230).

In the present embodiment, the entropy decoder 200 of the decoding device 2 may acquire a flag indicating whether or not the block is encoded using the JCCR for each of the first reconstructed block (block P) and the second reconstructed block (block Q). The filter controller 231 may control the boundary filtering strength Bs of the deblocking filter 230 on the basis of the flag of each of the first reconstructed block (block P) and the second reconstructed block (block Q). For example, when the flag of at least one of the first reconstructed block (block P) and the second reconstructed block (block Q) is "1", the filter controller 231 may control the boundary filtering strength Bs such that the filter process is performed by the deblocking filter 230.

In the present embodiment, the entropy decoder 200 of the decoding device 2 may further acquire tu_coded_flag indicating whether or not the block includes a non-zero transform coefficient for each of the first reconstructed block (block P) and the second reconstructed block (block Q). The filter controller 231 may control the boundary filtering strength Bs of the deblocking filter 230 further on the basis of tu_coded_flag for each of the first reconstructed block (block P) and the second reconstructed block (block Q). For example, when tu_coded_flag of at least one of the first reconstructed block (block P) and the second reconstructed block (block Q) is "1", the filter controller 231 may control the boundary filtering strength Bs such that the filter process is performed by the deblocking filter 230.

For each block of the first chrominance component (Cb component) and the second chrominance component (Cr component) to which the JCCR is applied, while tu_coded_flag described above is set to "1", actually, transform coefficients do not exist in one of the color components. Thus, in a similar manner to modification 2 described above, it is preferable to use determination as to whether or not the reconstructed prediction residual includes a non-zero value instead of determination as to whether or not a non-zero transform coefficient exists for a certain color component.

Other Embodiments

In the above-described embodiments, an example where the boundary filtering strength Bs is controlled as control of the deblocking filter (160, 230) has been mainly described. However, the control is not limited to the control of the boundary filtering strength Bs, and a filter length or switching of a plurality of filters may be controlled.

A program may be provided to cause a computer to execute the operations of the above-described encoding device 1. Further, a program may be provided to cause a computer to execute the operations of the decoding device 2. The program may be stored in a computer-readable medium. The program can be installed on a computer from a computer-readable medium. Here, the computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. A deblocking filter device comprising:
  a deblocking filter configured to perform a filter process on a boundary between a first reconstructed block and a second reconstructed block adjacent to the first reconstructed block; and
  a filter controller configured to control boundary filtering strength of the deblocking filter based on whether or not at least one of the first reconstructed block and the second reconstructed block is encoded using a predetermined process, wherein
  the predetermined process is an encoding tool generating a new prediction residual by updating a prediction residual for each color component separately, and
  the filter controller is configured to control the strength of the deblocking filter to perform the filter process when at least one of the first reconstructed block and the second reconstructed block is encoded using the predetermined process.

2. The deblocking filter device according to claim 1, wherein
  the filter controller is configured to control the boundary filtering strength to perform the filter process when at least one of the first reconstructed block and the second reconstructed block is encoded using the predetermined encoding tool, even when a non-zero transform coefficient exists in neither of the first reconstructed block nor the second reconstructed block.

3. A decoding device comprising:

the deblocking filter device according to claim 1; and an entropy decoder configured to acquire a flag indicating whether or not a block is encoded using the predetermined encoding tool for each of the first reconstructed block and the second reconstructed block, wherein the filter controller is configured to control the boundary filtering strength of the deblocking filter based on the flag for each of the first reconstructed block and the second reconstructed block.

4. The decoding device according to claim 3, wherein the filter controller is configured to control the boundary filtering strength to perform the filter process when the flag of at least one of the first reconstructed block and the second reconstructed block is "1".

5. The decoding device according to claim 3, wherein the entropy decoder is further configured to acquire tu_coded_flag indicating whether or not a block includes a non-zero transform coefficient for each of the first reconstructed block and the second reconstructed block, and the filter controller is configured to control the boundary filtering strength of the deblocking filter further based on the tu_coded_flag for each of the first reconstructed block and the second reconstructed block.

6. The decoding device according to claim 5, wherein the filter controller is configured to control the boundary filtering strength to perform the filter process when the tu_coded_flag of at least one of the first reconstructed block and the second reconstructed block is "1".

7. A program stored on a non-transitory computer-readable medium for causing a computer to function as the deblocking filter device according to claim 1.

* * * * *